United States Patent
Buzug et al.

[19]
[11] Patent Number: 5,956,435
[45] Date of Patent: *Sep. 21, 1999

[54] AUTOMATIC ANALYSIS OF TWO DIFFERENT IMAGES OF THE SAME OBJECT

[75] Inventors: Thorsten Buzug; Jürgen Weese, both of Hamburg, Germany

[73] Assignee: U.S. Philips Corporation, New York, N.Y.

[*] Notice: This patent issued on a continued prosecution application filed under 37 CFR 1.53(d), and is subject to the twenty year patent term provisions of 35 U.S.C. 154(a)(2).

[21] Appl. No.: 08/822,817

[22] Filed: Mar. 24, 1997

[30] Foreign Application Priority Data

Apr. 3, 1996 [DE] Germany .............. 196 13 342

[51] Int. Cl.⁶ .................................................. G06K 9/20
[52] U.S. Cl. ................... 382/283; 382/130; 382/168; 382/294
[58] Field of Search .................. 382/130, 107, 382/294–299, 215, 283, 154, 168–172; 378/1, 98.12, 41; 707/101

[56] References Cited

U.S. PATENT DOCUMENTS

| | | | |
|---|---|---|---|
| 4,636,953 | 1/1987 | Kageyama | 378/98.12 |
| 4,719,571 | 1/1988 | Rissanen et al. | 707/101 |
| 4,802,093 | 1/1989 | Ema | 378/1 |
| 4,870,692 | 9/1989 | Zuiderveld et al. | 382/107 |
| 4,888,794 | 12/1989 | Haaker et al. | 378/41 |
| 5,048,103 | 9/1991 | Leclerc et al. | 382/294 |

*Primary Examiner*—Leo H. Boudreau
*Assistant Examiner*—Ishrat Sherali
*Attorney, Agent, or Firm*—Dwight H. Renfrew, Jr.

[57] ABSTRACT

The invention relates to an automatic image analysis method in which two images which have been recorded at different instants are analyzed and a transformation function is determined on the basis of the shifts of image sections, which transformation function describes the shift from one image to another. In order to enable exact determination of this shift, corresponding image sections are determined in the two images by histogram analysis.

9 Claims, 5 Drawing Sheets

AUTOMATIC ANALYSIS OF TWO DIFFERENT IMAGES OF THE SAME OBJECT

BACKGROUND OF THE INVENTION

1. Field of the Invention

The invention relates to an automatic image analysis method in which two images of the same object, recorded at different instants, are analyzed by a) defining a number of image sections in an image region to be processed in one image, b) comparing each of these image sections with image sections in the other image, which occupy the same position or a position which has been shifted, within a search area, with respect to the respective image section in the one image, c) determining image sections in other image which corresponds best to the image sections in the one image, d) determining a shift between the image sections showing the best correspondence, and e) determining a transformation function approximating the shift between the individual image sections.

2. Description of the Related Art

The invention also relates to an device for carrying out the method.

One field of application is the medical diagnosis where images of a patient are formed at different instants. "Image" is to be understood to mean hereinafter a data set which characterizes a physical parameter in the pixels of a two-dimensional or three-dimensional spatial zone, for example the absorption of X-rays (in the case of X-ray images or X-ray CT images) or the strength of the transverse magnetization (in the case of magnetic resonance or MR images). The transformation function approximating the shift of the individual image sections provides quantitative information concerning the direction and extent of the deformation in the two images. Such a method enables evaluation of the changes in the vicinity of the operating zone on the basis of images taken before and after surgery, for example hip joint surgery or another surgical intervention.

Digital subtraction angiography (DSA) is a preferred field of application of the invention. Prior to injection of a contrast medium, a first image (mask image) is then recorded and after injection of the contrast medium a further image (contrast image) is recorded. The two images reproduce the same region of the patient. They deviate from one another in that the blood vessels of the patient are also reproduced in the contrast image. The difference image derived from the two images essentially shows only the blood vessels.

Because a certain period of time elapses between the recording of the contrast image and the mask image, inevitably slight movements of the patient, or deformations occur, due to respiration. The mask image and the contrast image, therefore, represent regions within the patient which have been shifted slightly relative to one another. This causes artefacts in the difference image, because the background contained in the mask image cannot be completely eliminated; the remaining background structures are undesirably superposed on the vessel structures in the difference image.

In a method of the kind set forth which is known from U.S. Pat. No. 5,048,103, first so-called "landmarks" are calculated, which landmarks are distributed as uniformally as possible across the image. An image section is then defined in which the landmark is situated at its center, and in the other image, in a search area around the pixel corresponding to the landmark, the image section is determined which corresponds best to the section around the landmark. The correspondence is determined by means of cross-correlation, the image sections with the best correspondence in the two images being determined as the sections for which the cross-correlation has a maximum. The cross-correlation however, leads to errors if there are no corresponding image sections, for example because the image section contains the image of a vessel in one image whereas no such vessel is imaged in the other image. The shift of the image section thus determined, therefore, does not correspond to the actual shift and hence the transformation function derived therefrom does not correctly describe the changes. Therefore, if the one image is transformed in conformity with the transformation function and the two image are subtracted, the artefacts in the difference image will not be eliminated.

SUMMARY OF THE INVENTION

It is an object of the present invention to provide a method of the kind set forth which offers adequate results also in the case of digital subtraction angiography.

This object is achieved in accordance with the invention in that f) a difference image section is formed from the image sections of the two images to be compared, g) a histogram is formed of the image values in the difference image section, h) the image sections in the two images which show the best correspondence being determined as the image sections whose associated difference image section has a histogram showing the narrowest frequency maximum or maxima.

Thus, in order to determine the degree of correspondence between two image sections, a difference image section is determined (the image values of one image section then being subtracted from the image values in the other image section which are associated with spatially corresponding pixels). A histogram of the image values is determined for the difference image section, i.e. the frequency of individual image values is determined. If the image sections were to correspond, the difference image section should have a frequency maximum at the image value zero or a constant image value; in the case of digital subtraction angiography a further frequency maximum may then occur which is caused by the vessels filled with contrast medium in the contrast image. Therefore, the image sections offering the best correspondence are determined as the image sections for which the histogram of the difference image section shows the most pronounced frequency maxima.

The difference image sections with the most pronounced frequency maxima can be determined in various ways. For example, the relevant maximum of the frequency could be determined for each difference image section, and the difference image section having the highest frequency maximum could be selected. However, in a preferred version of the invention the frequency distribution given by the histogram is converted into a weighted frequency distribution by application of a weighting function, the integral over the weighted frequency distribution being calculated and the difference image section having the narrowest frequency maximum or maxima being determined as the difference image section for which this integral has an extreme value. The integral over the frequency distribution (i.e. the sum of all frequency values in the histogram) equals 1 per definition so that this integral would be equal to 1 for all image sections. However, if a suitable weighting function is applied to the frequency distribution (by replacing each frequency value by the value provided by the weighting function), the integral takes an extreme value (maximum or minimum) for the image sections showing the best correspondence.

The weighting function in a further version of the invention does not have a point of inflection in the range between $p_b=0$ and $p_b=1$, where $p_b$ is the frequency of the image value b in the difference image section. It can be demonstrated that for such weighting functions the integral becomes either maximum or minimum, depending on its variation, if the image sections associated with the difference image section exhibit the best correspondence.

The function $f(p)=-p_b \log p_b$ is used as the weighting function in a preferred version of the invention, and the image section for which the integral is a minimum is determined. The integral then corresponds, for example to the entropy measure which is a measure for the information as known from information theory. If two image sections correspond, the difference image section derived therefrom contains the least information in the sense of information theory. However, weighting functions which approximate the function $f(p)=-p_b \log p_b$ can also be used.

Another version of the method according to the invention is preferably used for digital subtraction angiography, a difference image then being derived from a contrast image and a mask image, all pixels in the image region of the contrast image or the mask image to be processed being subjected to a transformation in conformity with this transformation function, and the difference image being derived by subtraction from the transformed mask image (contrast image) and the non-transformed contrast image (mask image). This version yields a difference image wherefrom the described artefacts have been removed to a high degree.

In a further version of the invention, the image region to be processed can be predetermined by the user as an image window which is adjustable in respect of position and size. If the region of diagnostic interest is thus predetermined by the user, the transformation need describe only the shift within the image window; therefore, it can be composed more simply than if it has to describe the shift in the entire image. The calculation time is thus substantially reduced. If, moreover, all pixels in the transformation region to be processed must be subjected to the transformation function, as in a DSA method, the calculation time is also reduced in that the image window limits the transformation to a smaller number of pixels.

If the contrasts within an image section are low, exact determination of the position of the corresponding image section in the respective other image is difficult or even impossible. If such image sections are used for calculating the transformation function, therefore, errors may occur. These errors can be avoided by subdividing the image region to be processed into a number of similar, adjoining image sections, by determining the contrasts for the individual image sections, and by selecting only the image sections with the highest contrasts for the determination of the shift. In a further version of the invention, the contrasts for the individual image sections are derived from a histogram of the image values in the relevant image section.

A device for carrying out the method of the invention, including an image-forming device for forming at least two images of an object to be examined.

means for predetermining a number of similar image sections in an image region of one image to be processed, means for comparing each of said image sections with image sections in the other image which occupy the same position as the image section in the one image, or a position which has been offset, within a search area, with respect thereto, means for determining the image section in the other image which corresponds best to the image section in the one image, means for determining the shift of the image sections thus corresponding, and means for determining a transformation function which approximates the shift of the individual image sections, is characterized in that means for comparing comprise means for forming a difference image section from respective image sections in each of the two images as well as means for forming a histogram of the image values in the difference image section, and that there are provided means for determining the image sections in the two images whose associated difference image section has a histogram showing the narrowest frequency maximum or maxima.

BRIEF DESCRIPTION OF THE DRAWING

The invention will be described in detail hereinafter with reference to the drawings. Therein.

DETAILED DESCRIPTION OF THE PREFERRED EMBODIMENTS

Figure 1:
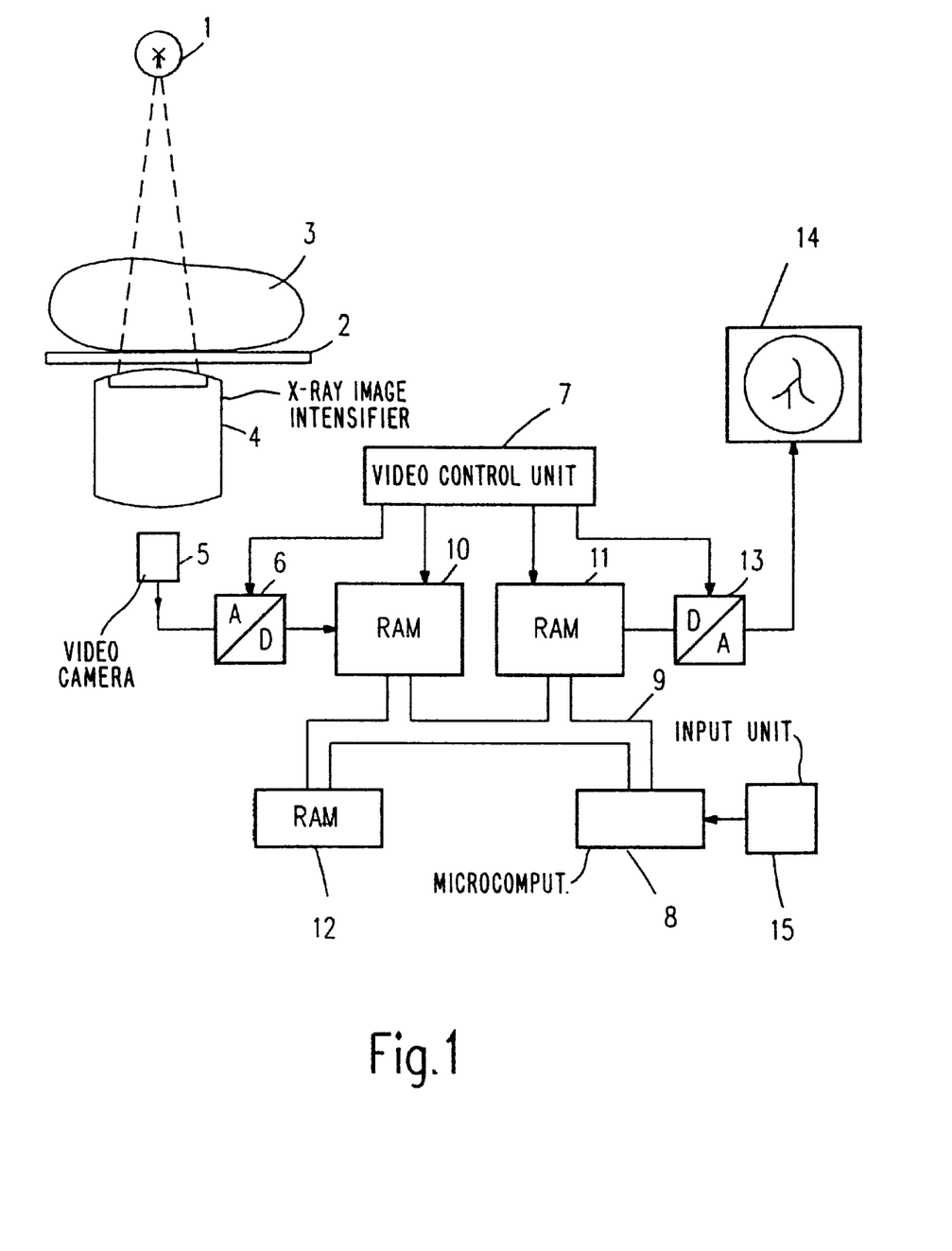
FIG. 1 shows a block diagram of a DSA device whereby the invention can be carried out.

FIG. 1 shows an X-ray system which includes an X-ray source 1 which irradiates a patient 3 arranged on a table top 2. The X-ray relief thus formed is incident on the entrance screen of an X-ray image intensifier 4 whose brightness-intensified exit image is picked up by a video camera 5. The analog signal supplied by the video camera is converted into a series of digital data words by an analog-to-digital converter 6. The data words represent the image value for a respective pixel, i.e. the brightness; of the image at the relevant pixel. The data words are stored at successive addresses in a memory 10 under the control of a video control unit 7.

Instead of the described acquisition of the X-ray image information, acquisition can also be performed, for example by means of a CCD camera or a semiconductor X-ray detector.

The memory 10 is connected, via a bus system 9, to a microcomputer 8 which can also access further image memories 11 and 12 via said bus system. The image memories 10, 11 and 12 serve to store the contrast image, the mask image and the difference image. An image, for example the difference image, can be read from the memory 11 via the video control unit 7 and transferred to a display unit (monitor) 14 via a digital-to-analog converter 13. To the microcomputer 8 there is connected inter alia an input unit 15 via which the user can fetch the various images or define image windows in the images.

Figure 3:
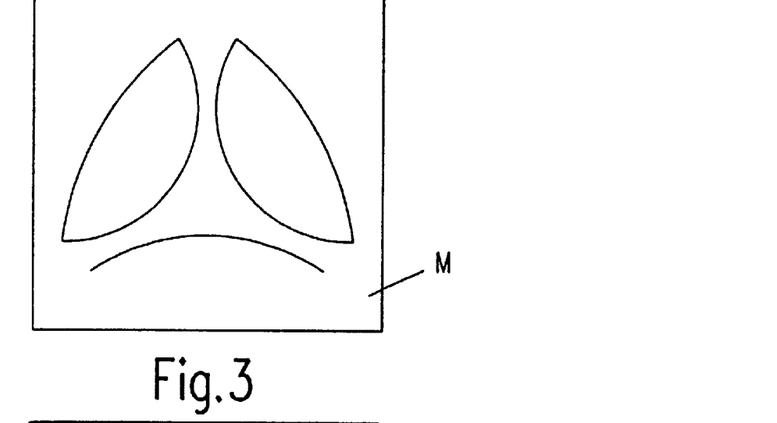
FIG. 3 shows a mask image.

FIG. 3 shows diagrammatically a mask image M which has been formed by subtraction angiography and which, generally speaking, is recorded prior to the injection of a contrast medium into the blood vessels. The mask image shows the structures representing the image background in angiography.

Figure 4:
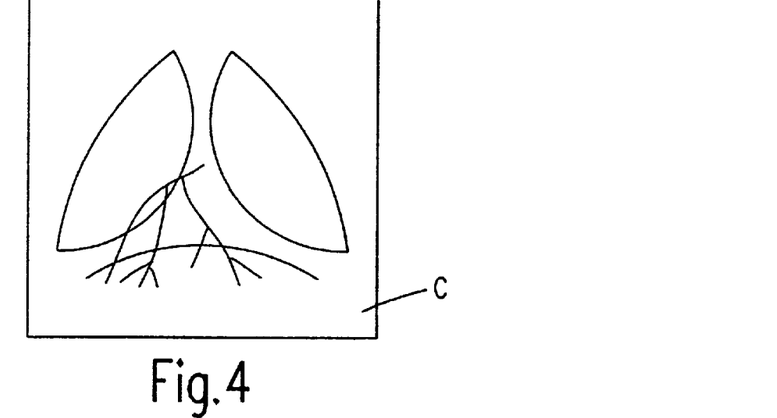
FIG. 4 shows a contrast image.

FIG. 4 shows a contrast image C recorded when a previously injected contrast medium has propagated through the vascular system of the patient. It shows not only the background but also the vessels filled with the contrast medium.

Figure 5:
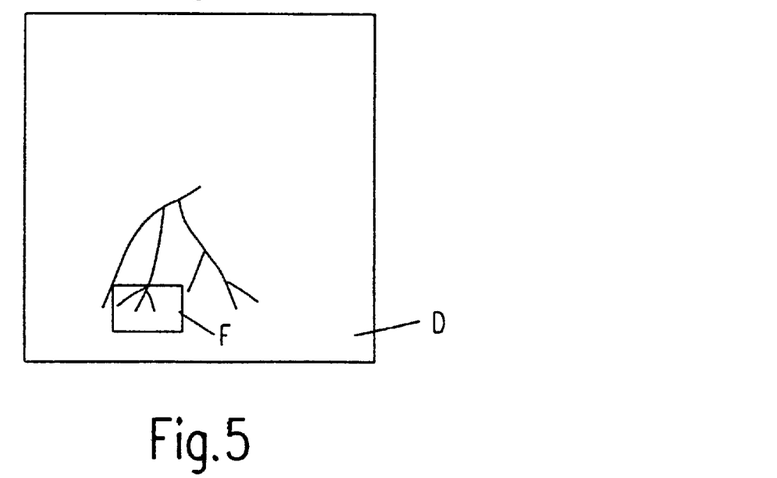
FIG. 5 shows a difference image.

FIG. 5 shows a difference image D, derived from the contrast image and the mask image by subtraction, which represents essentially only the vascular system. Should the background be shifted between the recording of the images M and C, parts of the image background will appear as image artefacts.

Figure 2:
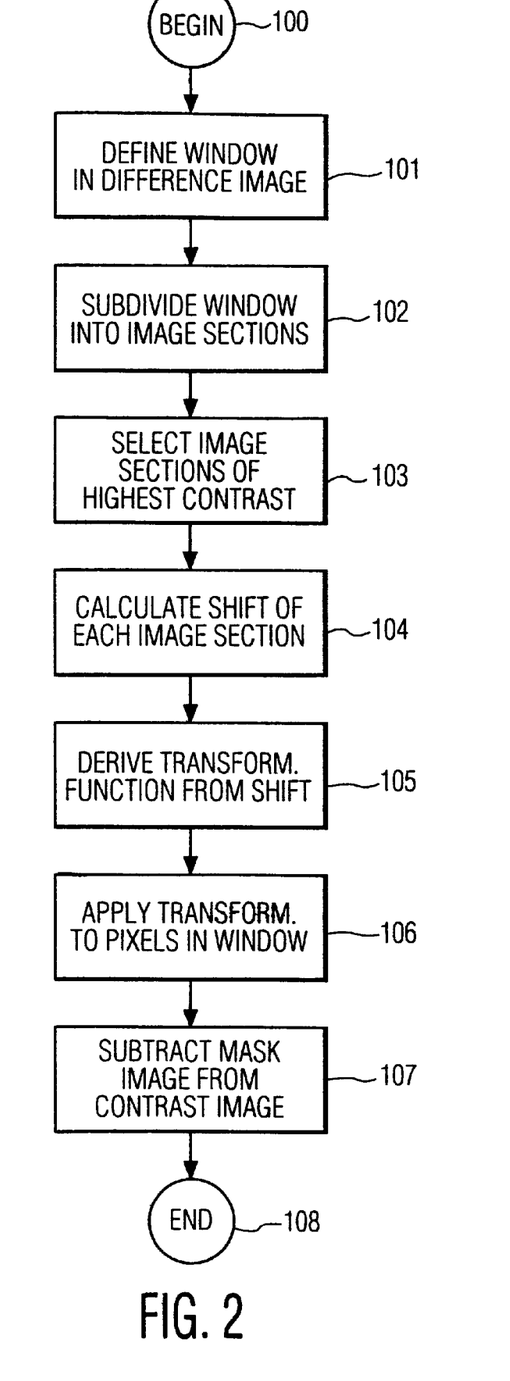
FIG. 2 shows a flow chart of the method according to the invention.

FIG. 2 shows a flow chart illustrating the method according to the invention for suppressing the artefacts initially occurring in the difference image D.

According to this flow chart, the microcomputer 8 processes the two images M and C. After initialization (block 100), the images shown in the FIGS. 3 to 5 have been recorded and stored. If image artefacts occur in the difference image D due to shifts between the formation of the contrast image and the mask image, the user defines, via the input unit 15 (FIG. 1), a window F (FIG. 5) of adjustable position and size in the difference image (block 101); this window encloses the image regions of particular interest for the diagnosis.

Figure 6A:
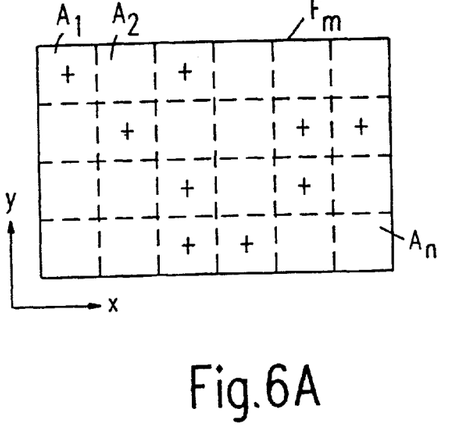
FIGS. 6a and 6b show an image window in the mask image and in the contrast image.

FIG. 6a shows a window $F_m$ in the mask image which corresponds to the predetermined window in the difference image in respect of position and size. The window $F_m$ in the mask image is then subdivided into a number of image sections $A_1, A_2 \ldots A_n$ (block 102 in FIG. 2). These image sections are represented by dashed lines in FIG. 6a. Preferably, they have the same size and shape, preferably a square shape. If the mask image comprises 1000×1000 pixels, the square image sections may have a side length of from 40 to 80 pixels. If the image sections are chosen to be significantly smaller, it will be increasingly more difficult to determine the shift of the individual image sections. If the image sections are chosen to be significantly larger, the distortion of the image window $F_m$ can only be comparatively inaccurately calculated. The subdivision of the image window into image sections (block 102) takes place automatically; preferably, the size of the window is automatically preset in such a manner that its side lengths correspond to an integer multiple of the side lengths of the image sections.

During the next step (block 103) the image sections of the image window are selected which exhibit the highest contrast. This can be simply performed by means of an entropy measure h in conformity with:

$$h = \sum_{b=b_{\min}}^{b=b_{\max}} p_b \log p_b, \qquad (1)$$

Therein:
b denotes the image values in the individual pixels of the image section (i.e. the brightness or grey values associated with these image points as digital data words),
$b_{min}$ is the smallest image value within the image section,
$b_{max}$ is the largest image value, and
$p_b$ is the frequency of the image value b in the relevant image section.

As is known, the following holds for the frequency $p_b$:

$$\sum_{b=b_{\min}}^{b=b_{\max}} p_b = 1, \qquad (2)$$

Figure 7A:
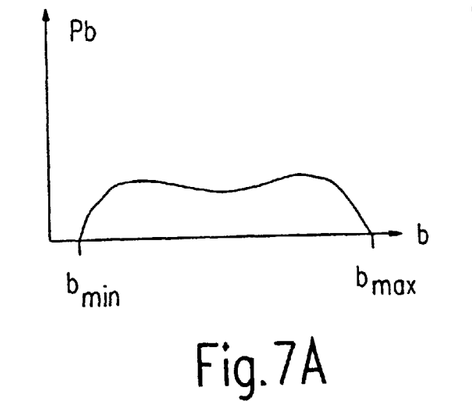
FIGS. 7a and 7b show frequency distributions in the various image sections of the mask image.
Figure 7B:
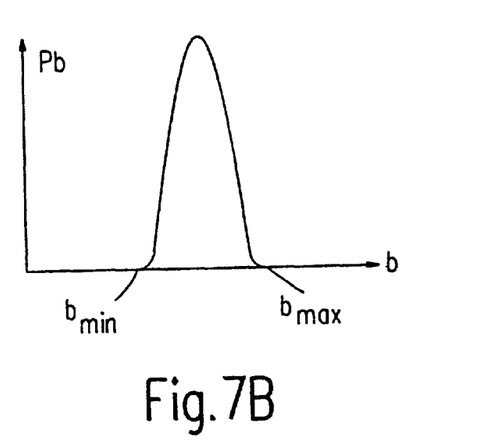

FIGS. 7a and 7b show the frequency $p_b$ as a function of the relevant image value b, that is to say for an image section of high contrast (FIG. 7a) and for an image section of low contrast (FIG. 7b). In an image of high contrast (FIG. 7a), comparatively many bright and dark pixels occur, and also pixels with intermediate grey values. A comparatively large entropy h is calculated for an image section having such a frequency distribution FIG. 7b, however, shows the frequency $p_b$ as a function of the image value for an image section of low contrast. The image section has an almost uniform brightness, so that the frequency distribution is limited to a small range of image values. In conformity with equation (1), a small entropy h is then calculated. (In the case of a uniformly bright image section, a single image value would have the frequency $p_b=1$, so that log $p_b$ would be zero and hence also the entropy h.)

After the entropy h has thus been determined for each image section $A_1, A_2 \ldots A_n$, the image sections having the highest contrast are selected. This can be done by selecting a given percentage or a given number of the image sections having the highest value h. However, it is alternatively possible to select the image sections whose entropy exceeds a limit value. In FIG. 6a these image sections are indicated by plus signs at their center.

In block 104 the shift of each individual image section between the mask image and the contrast image is calculated. This block comprises a series of steps which is shown in detail in a flow chart in FIG. 9.

Figure 9:
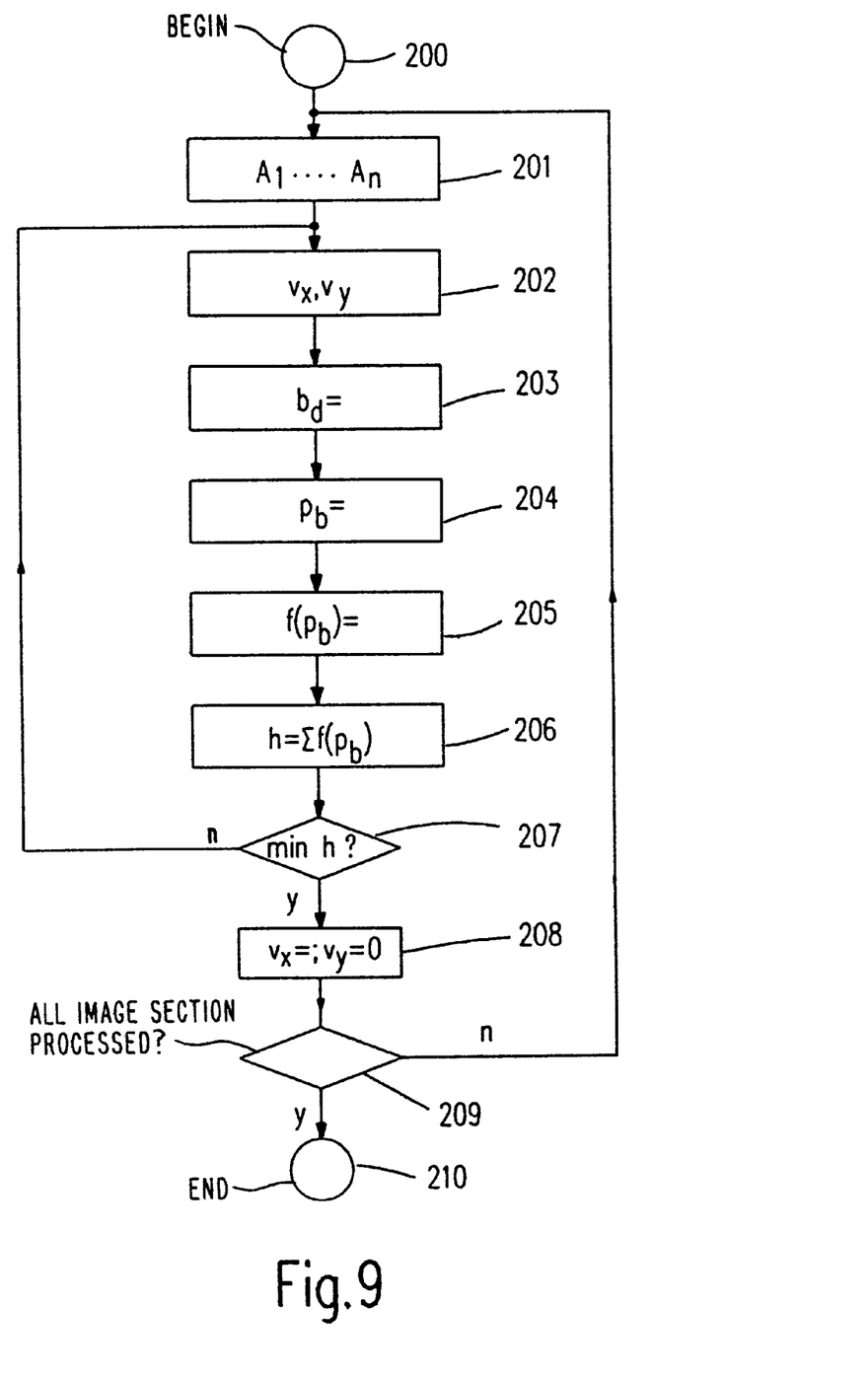
FIG. 9 shows a flow chart relating to block 104 in FIG. 2.

In the first step 201 thereof first a selected image section is defined, for example $A_1$. During the subsequent step 202, it is specified by which distance $v_x$, $v_y$ the image section in the contrast image is to be shifted in the x direction and the y direction with respect to the selected image section. $v_x$, $v_y$ may be zero, negative or positive. If $v_x=v_y=0$, the image sections in the contrast image and the mask image wherefrom the difference image section is derived are identical in respect of their position in the two images. The maximum values of $v_x$, $v_y$ (which may correspond to, for example 20 pixels) determine the size of the search area in which a corresponding image section is searched in the contrast image.

Subsequently, in the step 203 there is calculated the associated difference image section whose image values $b_d(x,y)$ are calculated from the image values $b_m(x,y)$ of the selected image section in the mask image and the image values $b_c(x-v_x, y-v_y)$ of an image section in the contrast image C. The following holds for the image values $b_d(x,y)$ of the difference image section:

$$b_d(x,y)=b_m(x,y)-b_c(x-v_x,y-v_y) \quad (3)$$

Figure 8A:
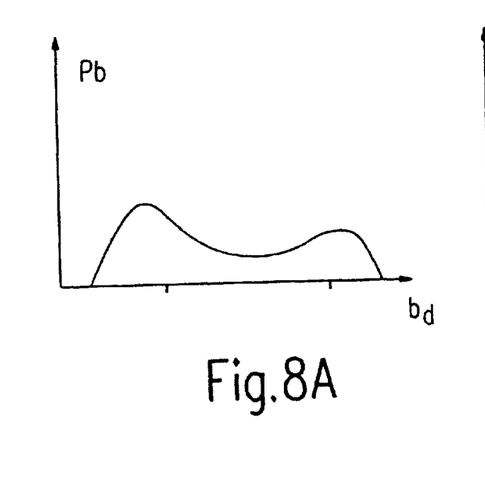
FIGS. 8a and 8b show frequency distributions of image values in various difference-image sections.
Figure 8B:
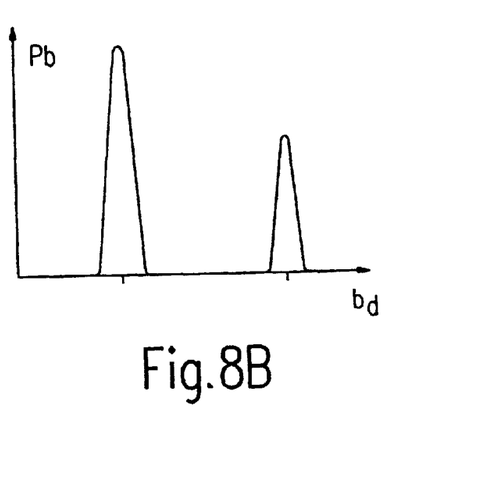

In the step 204 a histogram of the image value $b_d$ is formed for this difference image section, i.e. it is determined how frequently the individual image values occur in the difference image section, this frequency distribution again being subject to the equation (2). FIGS. 8a and 8b show the frequency $p_b$ as a function of the image value $b_d$ for two different image sections. FIG. 8b shows a difference image section derived from essentially corresponding image sections in the contrast image and the mask image. Two relative maxima can be recognized, i.e. one maximum associated with the image background and one maximum associated with the vessels present in the image section. If the image sections wherefrom the difference image section is derived do not match exactly, the maxima become increasingly flatter so that the frequency distribution shown in FIG. 8a is obtained. It can be seen therein that comparatively many image values occur with the frequency zero in the case of corresponding image sections, but also image values with a mean or high frequency (FIG. 8b), whereas comparatively many image values of low frequency, other than zero, occur in the case of non-corresponding image sections.

In order to enable the difference image sections to be distinguished from one another, in the next step 205 a weighting function $f(p_b)$ is applied to the frequency values of the histogram (i.e. the values $p_b$ are replaced by $f(p_b)$), resulting, in a weighted frequency distribution. A suitable weighting function is given by $f(p_b)=-p_b \log p_b$. This weighting function has the value zero for the frequencies 0 and 1. The integral over the frequency distribution thus weighted, therefore, is substantially smaller in the case of a distribution according to FIG. 8b than in the case of a frequency distribution according to FIG. 8a. However, use can also be made of other weighting functions which weight the high and the low frequency values $p_b$ less (or more) than the intermediate frequency values.

During the next step 206 a value is formed which corresponds to the surface area below the curve given by the weighted frequency, i.e. the integral over the weighted frequency or the sum of all weighted frequency values. If the above weighting function is used, the entropy measure h for this surface area is obtained therefrom in conformity with the equation (1). This entropy measure is minimum in the case of optimum correspondence of the image sections wherefrom the difference image section is derived.

During the next step 207 it is checked whether a relative minimum has been found for a. If this is not the case, the program returns to the block 202, after which the steps 202 to 207 are repeated for other values of $v_x$, $v_y$. If a respective value h has already been calculated for a plurality of difference image sections, the direction can be readily estimated in which the values $v_x$ and $v_y$ must be varied until the entropy measure h reaches a minimum. In this direction the shifts would be automatically varied until the minimum for h has been found. Therefore, it is not necessary to search all image sections present within said search area in the contrast image.

After the offset $v_x$, $v_y$ of the image section in the contrast image has thus been found for which the entropy measure h of the difference image section shows a minimum, these values $v_x$, $v_y$ are stored as the shift incurred by the relevant image section in the period of time between the recording of the mask image and the recording of the contrast image (block 208). These values are assigned as a shift to a given point in the relevant image section, preferably to its central point.

In block 209 it is checked whether all image sections selected in the block 103 have been processed. If this is not the case, the program returns to the block 201, after which the steps 201 to 209 are repeated for another selected image section. The sub-routine shown in block 9, representing the steps of the method within the block 104 has been completed when all selected image sections have been processed.

Figure 6B:
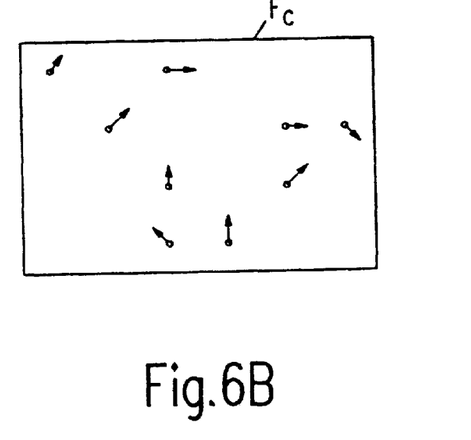

FIG. 6b shows the shift vectors thus found for the selected image sections. It is clearly shown that the shift vectors for the different sections deviate from one another in respect of size and direction.

During the next step (block 105) a transformation function of the form $$X=a_0+a_1x+a_2y \quad (4)$$
$$Y=a_3+a_4x+a_5y \quad (5)$$

is derived from the shift thus found or from the position occupied by the central points of the selected image sections in the contrast image due to the shift.

Therein:
  x, y are the coordinates of the central points of the selected image sections in the mask image,
  X, Y are the coordinates of the central points in the contrast image because of the shift, and
  $a_0 \ldots a_5$ are coefficients which can be calculated by means of the shifts determined in advance for the central points of the selected image sections.

Because the shift is usually determined for more than three image sections, the equations (4) and (5) represent a redundant system of equations which can be solved by means of the singular value analysis in the sense of the least-squares deviations. For details concerning this method of solution, reference is made co the book by W. H. Press et al., "Numerical Recipies in C" (Cambridge University Press, Cambridge, 1990), pp. 534–539.

After the parameters of the transformation function (i.e. the coefficients $a_0 \ldots a_5$) have been calculated in this manner, pixels in the image window of the mask image are subjected (block 106) to the affine geometrical transformation defined by the equations (4) and (5), after which the mask image is subtracted from the contrast image (block 107) once again. The execution of the method has then been completed (108).

At the area of the image window F the difference image thus formed is practically free from said image artefacts. Even though the transformation function according to the equations (4) and (5) has been determined merely on the basis of translatory shifts of the image sections, the effects of distortions due not only to a translation but also to a rotation, a change of scale and/or tilting can also be eliminated. In the case of complex distortions, a different transformation function can be used, for example a function with higher-order polynomials.

In the described embodiment it was determined how the position of the central point of the selected image sections in the contrast image changes; therefrom a transformation function was determined whereto the pixels within the image window in the mask image were subjected. However, it is also possible to leave the mask image unchanged and to subject the image window in the contrast image to an inverse transformation instead, the points in the image window then being shifted according to the inverse transformation function. This transformation function, however, then describes an inverse transformation with respect to the equations (4) and (5).

The invention has been described on the basis c,f a DSA method with two-dimensional images. However, it can also be used for three-dimensional images which may have been formed by computer tomography or by an MR method; in that case the image sections to be compared are also three-dimensional. Furthermore, the invention is not restricted to digital subtraction angiography; the invention can also be used for methods where changes in the operating region are to be recognized after a surgical intervention. Because in that case a comparatively long period of time elapses between the recording of the two images, it makes sense to ensure, for example by means of implanted marks, that the two images reproduce the same area of the patient. For these applications it is not necessary either to derive a difference image from the two images; it suffices when the extent of the changes can be represented by means of the transformation function. In special cases it may be sufficient that for pixels that can be predetermined in the one image their position in the other image is indicated and reproduced by means of the transformation function.

We claim:

1. An automatic image analysis method for analyzing a first image and a second image of the same object, the first and the second images comprising pixels having image values, the method comprising:

defining a plurality of image sections $(A_1, A_2, \ldots A_n)$ which subdivide an image region (F) to be processed in the first image, determining for each image section in the first image an optimum shift $(v_x, v_y)$ from the first image to the second image, wherein, for a particular image section, the optimum shift is selected to be that particular shift $(v_x, v_y)$ for which a difference histogram associated with the particular image section and with the particular shift has the narrowest frequency maximum or maxima, the optimum shift being limited to be within a search area, and wherein the difference histogram associated with a particular image section and with a particular shift is determined by (i) shifting the particular image section in the first image by the particular shift from its position in the first image to a shifted image section in the second image, (ii) forming a difference image section having pixels with difference image values determined by subtracting image values of first pixels in the particular image section from image values of corresponding second pixels in the shifted image section, a first pixel in the particular image section in the first image corresponding to a second pixel in the shifted image section in the second image if the positions of the two pixels differ by the particular shift, and (iii) forming the difference histogram as a histogram of the frequencies of the difference image values of pixels in the difference image section, and determining an affine transformation function (X, Y) from the first image to the second image approximating the optimum shifts $(y_x, v_y)$ determined for the image sections.

2. An automatic image analysis method as claimed in claim 1, wherein the distribution (p(b)) given by the difference histogram is converted into a weighted distribution by application of a weighting function (f(p)), wherein the integral over the weighted distribution is calculated, and wherein the difference histogram having the narrowest frequency maximum or maxima is determined as the difference histogram for which this integral has an extreme value.

3. An automatic image analysis method as claimed in claim 2, wherein the weighting function (f(p)) does not have a point of inflection in the range between 0 and 1.

4. An automatic image analysis method as claimed in claim 3, wherein the function $f(p) = -p_b \log p_b$ is used as the weighting function, and the difference histogram for which the integral (h) is a minimum is determined.

5. An automatic image analysis method as claimed in claim 1, wherein the first image is a mask image and the second image is a contrast image, and wherein a difference image (D) is derived from the contrast image (C) and the mask image (M), all pixels (x,y) in the image region (F) of the mask image (M) to be processed being subjected to a transformation in conformity with the determined transformation function, and the difference image (D) being derived by subtraction of image values of the transformed mask image and image values of the non-transformed contrast image.

6. An automatic image analysis method as claimed in claim 1, wherein the image region to be processed can be predetermined by the user as an image window (F) which is adjustable in respect to position and size.

7. An automatic image analysis method as claimed in claim 1, wherein the image region (F) to be processed is subdivided into a number of similar, adjoining initial image sections $(A_1, A_2 \ldots A_n)$, wherein the contrasts are determined for the individual initial image sections $(A_1, A_2 \ldots A_n)$, and wherein the initial image sections with the highest contrasts are selected as the plurality of defined image sections.

8. An automatic image analysis method as claimed in claim 7, wherein the contrasts for the individual initial image sections $(A_1, A_2 \ldots A_n)$ are derived from a histogram of the image values in the relevant initial image section.

9. A device for automatic image analysis comprising:

an image-forming device for forming at least two images of an object to be examined, means for defining a plurality of image sections $(A_1, A_2, \ldots A_n)$ which subdivide an image region (F) to be processed in the first image, means for determining for each image section in the first image an optimum shift $(y_x, v_y)$ from the first image to the second image, wherein, for a particular image section, the optimum shift is selected to be that particular shift $(y_x, v_y)$ for which a difference histogram associated with the particular image section and with the particular shift has the narrowest frequency maximum or maxima, the optimum shift being limited to be within a search area, and wherein the difference histogram associated with a particular image section and with a particular shift is determined by (i) shifting the particular image section in the first image by the particular shift from its position in the first image to a shifted image section in the second image, (ii) forming a difference image section having pixels with difference image values determined by subtracting image values of first pixels in the particular image section from image values of corresponding second pixels in the shifted image section, a first pixel in the particular image section in the first image corresponding to a second pixel in the shifted image section in the second image if the positions of the two pixels differ by the particular shift, and (iii) forming the difference histogram as a histogram of the frequencies of the difference image values of pixels in the difference image section, and means for determining an affine transformation function (X, Y) from the first image to the second image approximating the optimum shifts $(v_x, v_y)$ determined for the image sections.

* * * * *